United States Patent
Miyano et al.

(10) Patent No.: US 10,407,754 B2
(45) Date of Patent: Sep. 10, 2019

(54) PROCESS FOR MANUFACTURING RECLAIMED ALLOY MATERIAL AND PROCESS FOR MANUFACTURING RECLAIMED AMORPHOUS ALLOY RIBBON

(71) Applicant: HITACHI METALS, LTD., Minato-ku, Tokyo (JP)

(72) Inventors: Kohei Miyano, Yasugi (JP); Morifumi Kuroki, Yasugi (JP)

(73) Assignee: Hitachi Metals, Ltd., Minato-ku, Tokyo (JP)

( * ) Notice: Subject to any disclaimer, the term of this patent is extended or adjusted under 35 U.S.C. 154(b) by 648 days.

(21) Appl. No.: 15/025,629

(22) PCT Filed: Sep. 25, 2014

(86) PCT No.: PCT/JP2014/075370
§ 371 (c)(1),
(2) Date: Mar. 29, 2016

(87) PCT Pub. No.: WO2015/046299
PCT Pub. Date: Apr. 2, 2015

(65) Prior Publication Data
US 2016/0244863 A1 Aug. 25, 2016

(30) Foreign Application Priority Data

Sep. 30, 2013 (JP) .................. 2013-203818

(51) Int. Cl.
C22C 1/00 (2006.01)
C22B 7/00 (2006.01)
(Continued)

(52) U.S. Cl.
CPC ............... *C22C 1/002* (2013.01); *B03C 1/02* (2013.01); *B03C 1/30* (2013.01); *B22D 11/001* (2013.01);
(Continued)

(58) Field of Classification Search
CPC ....... C22C 1/002; C22C 1/02; C22C 2202/02; C22C 45/02; C22B 1/005; C22B 7/001;
(Continued)

(56) References Cited

U.S. PATENT DOCUMENTS

| 3,933,473 A | 1/1976 | Dickson |
| 2010/0132907 A1 | 6/2010 | Ozaki et al. |
| 2013/0314198 A1 | 11/2013 | Yoshizawa et al. |

FOREIGN PATENT DOCUMENTS

| CN | 101678443 | 3/2010 |
| JP | 63-147561 | 6/1988 |

(Continued)

OTHER PUBLICATIONS

Del Vecchio, Robert M., et al. "Magnetism and Related Core Losses." Transformer Design Principles: with Applications to Core-Form Power, CRC Press, 2010. (Year: 2010).*

(Continued)

*Primary Examiner* — Colleen P Dunn
*Assistant Examiner* — Anthony M Liang
(74) *Attorney, Agent, or Firm* — Jeffrey L. Costellia; Nixon Peabody LLP

(57) ABSTRACT

A process for manufacturing a reclaimed alloy material includes the steps of crushing a magnetic core including an amorphous alloy ribbon; putting a prepared organic solvent and crushed pieces obtained in the step of crushing into a container and putting the crushed pieces into contact with the organic solvent in the container; selectively discharging the organic solvent from the container after putting the crushed pieces into contact with the organic solvent; and evaporating, after discharging the organic solvent, the organic solvent remaining in the container. The crushed pieces, removed from the container after the organic solvent is evaporated, is reused as a reclaimed alloy material.

7 Claims, 4 Drawing Sheets

(51) Int. Cl.
  *B22F 8/00* (2006.01)
  *B03C 1/02* (2006.01)
  *B03C 1/30* (2006.01)
  *B22D 11/06* (2006.01)
  *C23G 5/04* (2006.01)
  *B22D 11/00* (2006.01)
  *C21D 9/52* (2006.01)
  *C22B 1/00* (2006.01)
  *C22C 1/02* (2006.01)
  *C22C 45/02* (2006.01)
  *B03B 5/00* (2006.01)
  *B03B 7/00* (2006.01)

(52) U.S. Cl.
  CPC ............ *B22D 11/0611* (2013.01); *B22F 8/00* (2013.01); *C21D 9/52* (2013.01); *C22B 1/005* (2013.01); *C22B 7/001* (2013.01); *C22B 7/005* (2013.01); *C22C 1/02* (2013.01); *C22C 45/02* (2013.01); *C23G 5/04* (2013.01); *B03B 5/00* (2013.01); *B03B 7/00* (2013.01); *B22F 2998/10* (2013.01); *C21D 2201/03* (2013.01); *C22C 2202/02* (2013.01); *Y02P 10/214* (2015.11); *Y02P 10/24* (2015.11); *Y02W 30/541* (2015.05)

(58) Field of Classification Search
  CPC ...... C22B 7/005; C21D 2201/03; C21D 9/52; B22F 2998/10; B22F 8/00; B22F 1/0074; B22F 1/0085; B22F 2009/001; B03B 5/00; B03B 7/00; C23G 5/02; Y02W 30/54; Y02W 30/541; B08B 3/041; B08B 3/042; B08B 3/044
  See application file for complete search history.

(56) References Cited

FOREIGN PATENT DOCUMENTS

| JP | H11-286463 | | 10/1999 |
|---|---|---|---|
| JP | 2002-248455 | | 9/2002 |
| JP | 2003-062532 | | 3/2003 |
| JP | 2003062532 A | * | 3/2003 |
| JP | 2004066226 A | * | 3/2004 |
| JP | 2005-211827 | | 8/2005 |
| JP | 2005-261993 | | 9/2005 |
| JP | 2005261993 A | * | 9/2005 |
| JP | 2006-191156 | | 7/2006 |
| WO | WO 2012-102379 | | 8/2012 |

OTHER PUBLICATIONS

"Unit Operations in Secondary Metals Processing." The Physical Separation and Recovery of Metals from Wastes, by Terry J. Veasey et al., Gordon and Breach Science Publishers, 1993, p. 69. (Year: 1993).*

Hitachi Metals, Ltd., Hitachi Metals Amorphous Metals Recycling Plant Set for Full-Scale Operation in April, Amorphous Kinzoku Recycle Shisetsu Kado, Materials Magic, Feb. 28, 2013.

Kunio Iwata, "Research Related to Recycling the Amorphous Transformer", Gijutsu Kaihatsu News, No. 103, Chubu Denryoku, Jul. 2003, pp. 19-20.

International Search Report for PCT/JP2014/075370, dated Nov. 11, 2014.

* cited by examiner

FIG.2
(a)
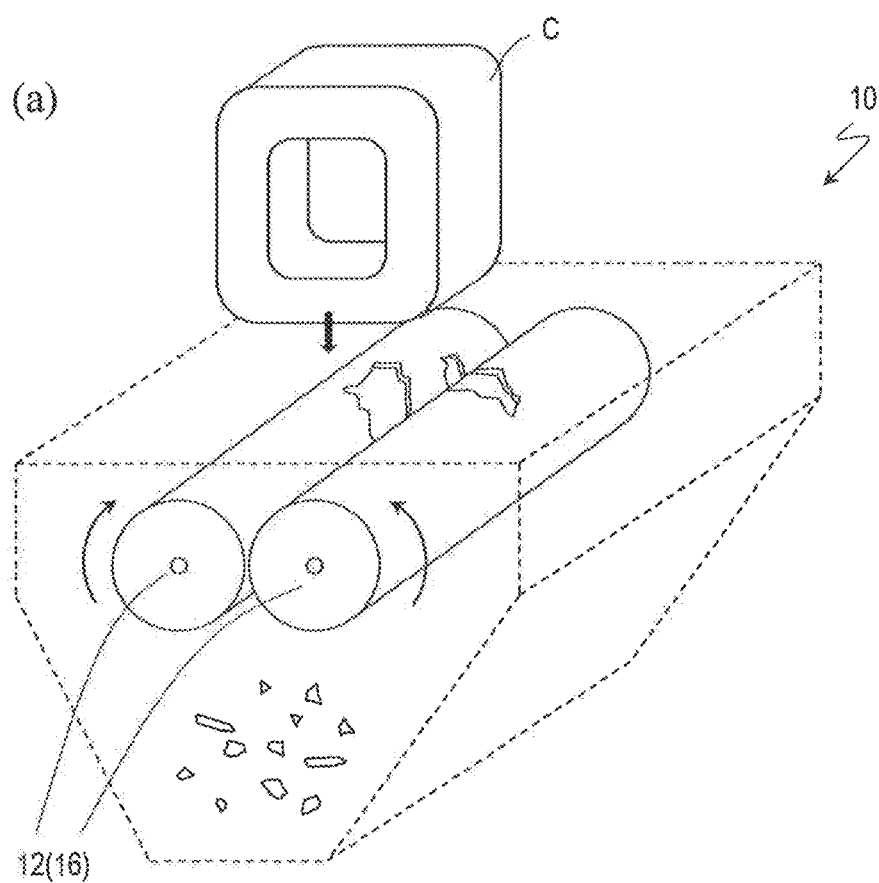
(b)
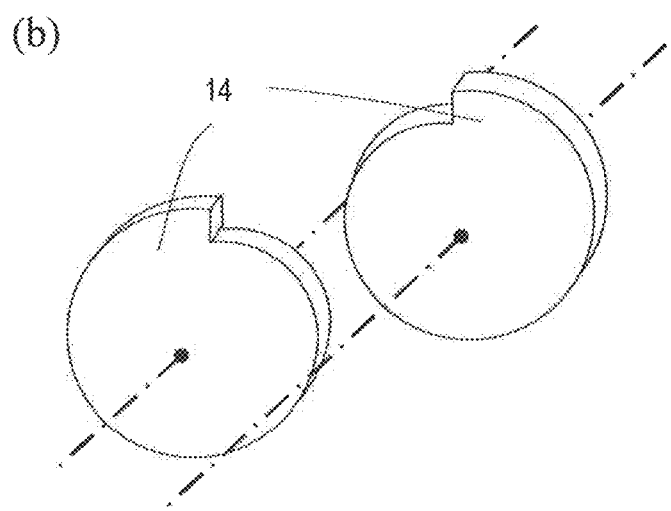

PROCESS FOR MANUFACTURING RECLAIMED ALLOY MATERIAL AND PROCESS FOR MANUFACTURING RECLAIMED AMORPHOUS ALLOY RIBBON

TECHNICAL FIELD

The present invention relates a process for manufacturing a reclaimed alloy material from an amorphous alloy magnetic core included in a used transformer or the like, and a process for manufacturing a reclaimed amorphous alloy ribbon by use of the obtained reclaimed alloy material.

BACKGROUND ART

An amorphous alloy has splendid magnetic characteristics and thus is used as a material of a magnetic core of an electric power distribution device or a transformer, or as a material of a magnetic core of an electronic/electrical circuit.

A transformer using an amorphous alloy for a magnetic core is referred to as an "amorphous transformer". In an amorphous transformer, the loss of an electric current caused when no load is applied is suppressed to about ⅓ of that in a transformer using an electromagnetic steel plate for a magnetic core. Therefore, an amorphous transformer has been used more and more as a transformer fulfilling the recent requirement for energy savings.

In general, an amorphous transformer has a life of about 20 to 30 years. Therefore, in North America and Japan, in which amorphous transformers started to be used widely about 20 years ago, the amorphous transformers have recently been started to be discarded or replaced with new ones.

The life of an amorphous transformer is usually determined by the degree of deterioration of insulating oil in which the magnetic core and the coil of the transformer are immersed. Deteriorated insulating oil needs to be discarded, but components and materials other than the insulating oil may be recycled.

In such a situation, an appropriate recycle technology for amorphous transformers and the like is desired to be established.

In order to realize this, the present applicant stated in Nikkei Press Release dated Feb. 28, 2013 (Non-patent Document 1) that the present applicant would run a recycle plant to perform crushing, magnetic separation, cleaning and drying of used amorphous magnetic cores and thus to manufacture a material of an amorphous alloy from the used magnetic cores, which were conventionally discarded.

In a study on recycling amorphous transformers, it has been proposed to put an amorphous magnetic core directly into an electric furnace in order to recycle the amorphous magnetic core into ferro-boron, which is a main material of the amorphous alloy (Non-patent Document 2).

CITATION LIST

Non-Patent Literature

Non-patent Document 1: Nikkei Press Release published on Feb. 28, 2013: "Hitachi Metals starts full-scale running of recycle plant of amorphous metal core in April".
Non-patent Document 2: Chubu Electric Power Technological Development News, July 2003 (No. 103), pages 19-20, "Studies on recycling an amorphous transformer"

SUMMARY OF INVENTION

Technical Problem

As described above, establishment of an appropriate recycle technology for an amorphous transformer and the like is an important issue, and it is now desired to establish an optimal technology.

An object of the present invention is to provide a process for manufacturing a reclaimed alloy material by use of a magnetic core containing an amorphous alloy and also to provide a process for manufacturing a reclaimed amorphous alloy ribbon by use of the obtained reclaimed alloy material.

Solution to Problem

A process for manufacturing a reclaimed alloy material in an embodiment according to the present invention includes the steps of crushing a magnetic core including an amorphous alloy ribbon; putting a prepared organic solvent and crushed pieces obtained in the step of crushing into a container and putting the crushed pieces into contact with the organic solvent in the container; selectively discharging the organic solvent from the container after putting the crushed pieces into contact with the organic solvent; and evaporating, after discharging the organic solvent, the organic solvent remaining in the container. The crushed pieces, removed from the container after the organic solvent is evaporated, is reused as a reclaimed alloy material.

In an embodiment, the step of evaporating the organic solvent remaining in the container includes the step of, after the organic solvent is discharged, decreasing a pressure inside the container and heating an outer circumferential portion of the container to evaporate the organic solvent remaining in the container.

In an embodiment, the step of putting the crushed pieces into contact with the organic solvent includes the step of putting the crushed pieces into contact with the organic solvent in a flow of the organic solvent generated by moving the container.

In an embodiment, the container is a sealable drum-shaped container, and the step of putting the crushed pieces into contact with the organic solvent includes the step of axially rotating the drum-shaped container to stir the organic solvent and the crushed pieces.

In an embodiment, the drum-shaped container includes a fin located to protrude to an inner position of the drum-shaped container from an inner circumferential surface thereof.

In an embodiment, the process further includes the step of, after the step of crushing, magnetically adsorbing and thus separating the crushed pieces by a magnetic separation device.

In an embodiment, the step of crushing is performed by a biaxial shearing crusher.

In an embodiment, the organic solvent is put into the container in a state of being heated to a temperature of 40° C. or higher and 100° C. or lower.

A process for manufacturing a reclaimed amorphous alloy ribbon in an embodiment according to the present invention includes the steps of putting a reclaimed alloy material obtained by any of the above-described processes and another material alloy into a melting furnace and melting the reclaimed alloy material and the another material alloy in the air or in a non-oxidative atmosphere; and supplying a molten alloy containing the reclaimed alloy material and the another material alloy melted in the melting furnace to a rotating cooling roll to obtain a rapidly solidified alloy.

In an embodiment, the reclaimed alloy material is contained at a content of 10% by mass or less with respect to the entirety of the reclaimed alloy material and the another material alloy.

In an embodiment, a process for manufacturing a reclaimed amorphous alloy ribbon includes, for example, a crushing step of mechanically crushing a magnetic core including an amorphous alloy ribbon in a stacked state to obtain crushed alloy ribbon pieces; a cleaning step of putting the crushed alloy ribbon pieces obtained in the crushing step and an organic solvent into the inside of a drum and rotating, in a horizontal state, the drum in a sealed state; an organic solvent discharge step of discharging the organic solvent from the drum; an evaporation step of decreasing the pressure inside the drum and rotating the drum in a horizontal state while heating the drum to evaporate and thus remove the remaining organic solvent to obtain reclaimed alloy ribbon pieces; a melting step of putting the obtained reclaimed alloy ribbon pieces, as a part of a material to be melted, into a melting furnace located in the air or in a non-oxidative atmosphere; and a step of injecting the molten alloy obtained in the melting step onto a cooling roll and rapidly solidifying the molten alloy to manufacture an alloy ribbon.

Advantageous Effects of Invention

In an embodiment according to the present invention, in a process of recovering a magnetic core included in a transformer or the like that is to be discarded so that the magnetic core is reused as a recyclable material, a reclaimed amorphous alloy ribbon having highly stable properties are obtained at a high productivity.

BRIEF DESCRIPTION OF DRAWINGS

FIG. 2 shows an example of crusher usable in a process for manufacturing a reclaimed alloy material in the embodiment according to the present invention; FIG. 2(a) is an isometric view schematically showing an entire structure of the crusher and FIG. 2(b) is an isometric view showing an example of shearing blades.

FIG. 3(a) is a side view thereof, FIG. 3(b) is a partially cut isometric view showing an inner portion thereof, and FIG. 3(c) is a cross-sectional view thereof.

DESCRIPTION OF EMBODIMENTS

Figure 1:
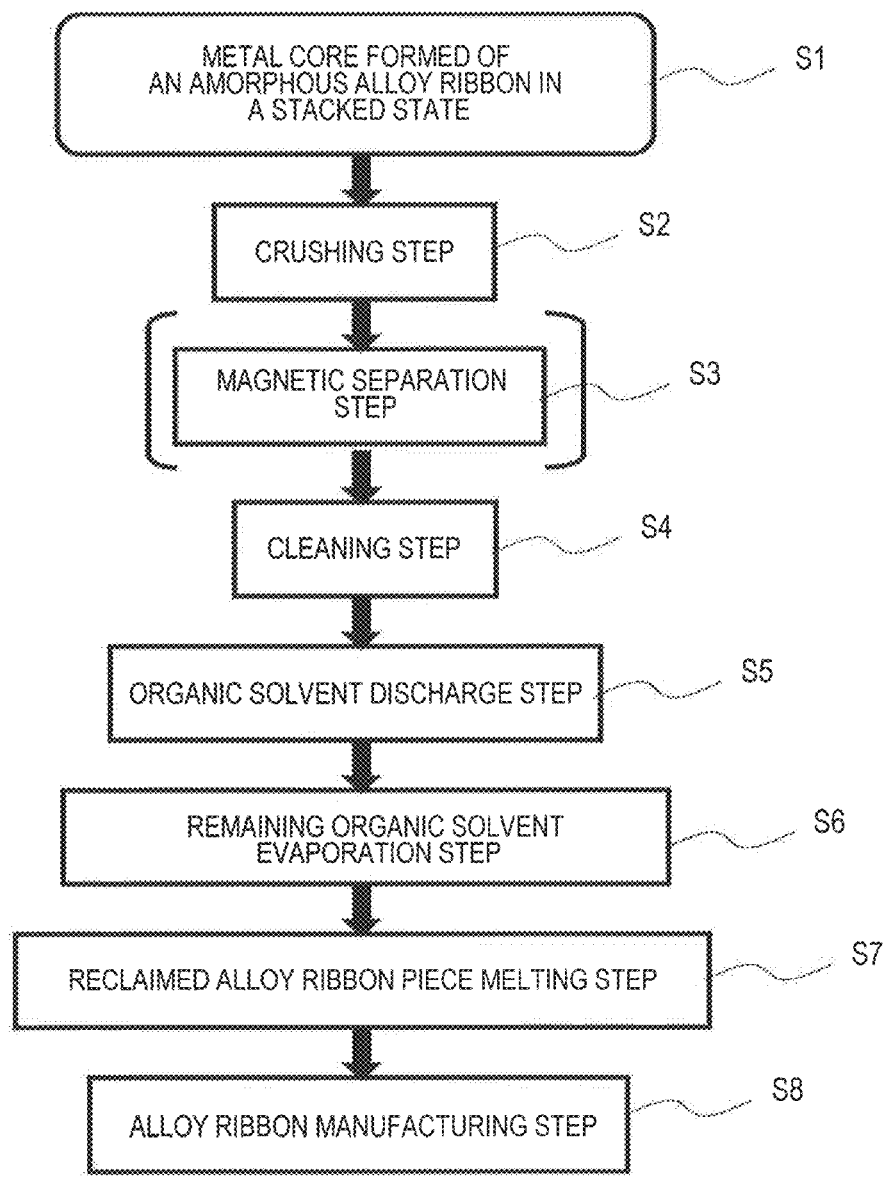
FIG. 1 shows a flow of a process for manufacturing a reclaimed amorphous alloy ribbon in an embodiment according to the present invention.

Hereinafter, a process for manufacturing a reclaimed alloy in an embodiment according to the present invention will be described in detail with reference to the drawings. As shown in FIG. 1, a process for manufacturing a reclaimed alloy in this embodiment according to the present invention may include step S1 of preparing a magnetic core including an amorphous alloy ribbon, for example, a magnetic core including an amorphous alloy ribbon in a stacked state, step S2 of crushing the magnetic core, step S3 of magnetic separation, which is optionally performed, step S4 of putting an organic solvent into contact with the crushed pieces to clean the crushed pieces, step S5 of selectively discharging the organic solvent used for the cleaning from a container, step S6 of evaporating the organic solvent remaining in the container, step S7 of melting the resultant reclaimed alloy material (post-cleaning crushed pieces), and step S8 of manufacturing a reclaimed amorphous alloy ribbon by use of the resultant molten alloy.

Hereinafter, specific steps of the process for manufacturing an amorphous alloy ribbon performed by use of a reclaimed alloy material will be described along with the flow shown in FIG. 1. According to the process in this embodiment, a reclaimed alloy material obtained from a used magnetic core may be directly put into a melting furnace as a material to be melted that is to be used for manufacturing a reclaimed amorphous alloy.

<Crushing Step>

In the crushing step, a magnetic core that includes an amorphous alloy ribbon and is recovered to be recycled is mechanically crushed by a crusher.

A usable crusher may be a biaxial shearing crusher. FIG. 2(a) and FIG. 2(b) are each an isometric view schematically showing an example of biaxial shearing crusher. As shown in FIG. 2(a), a crusher 10 usable in this embodiment includes two axially rotatable shaft members 12, which are located parallel to each other. The shaft members 12 each include a plurality of shearing blades 14 as shown in FIG. 2(b). FIG. 2(b) shows only one shearing blade 14 included in each of the shaft members 12. In actuality, however, the plurality of shearing blades 14 may be stacked in a state where tips of the shearing blades 14 are located at different positions in a circumferential direction. The shearing blades 14 included in each of the shaft members 12 may be located to have a disc-shaped member, with no shearing blade, interposed therebetween, and the shearing blades 14 of the shaft members 12 may be located alternately such that one of the shearing blades 14 of one of the shaft members 12 is located between two shearing blades 14 of the other shaft member 12. In FIG. 2(a), the shaft members 12 are shown as being cylindrical. In actuality, however, the shaft members 12 may be provided such that outer circumferences of the shearing blades 14 may be geared with each other as described in, for example, Japanese Laid-Open Patent Publication No. Sho 63-147561.

Use of the biaxial shearing crusher 10 having such a structure allows the amorphous alloy ribbon included in a magnetic core C to be crushed efficiently into crushed alloy ribbon pieces.

The shearing blades 14 each have a diameter of, for example, 500 to 800 mm and a thickness of, for example, 40 to 80 mm. With the shearing blades 14 having such a size, tiny crushed pieces that are difficult to be handled are not easily formed.

The crusher 10 includes, for example, 10 to 20 shearing blades 14 stacked along two axes (in the two shaft members 12). Such shearing blades 14 form biaxial blade lines 16. Herein, the shaft members 12 each including the shearing blades 14 may be referred to as "blade lines 16". In the shearing blades of the biaxial blade lines 16, parts of peripheral portions thereof (each part having a length of about 50 mm) overlap each other alternately. The crusher 10 is not limited to having the above-described structure, and may have any of various forms. The crusher 10 is not limited to being a biaxial shearing crusher, and may be a monoaxial shearing crusher or of any other form.

Hereinafter, a crushing operation performed by the crusher 10 will be described.

Between the biaxial blade lines 16 included in the biaxial shearing crusher 10, the magnetic cores C are put from above one by one. The blade lines 16 are axially rotated (rotated forward) so as to hold each magnetic core C therebetween. The biaxial blade lines 16 are rotated in opposite directions from each other. Herein, a type of rotation by which parts of the biaxial blade lines 16 facing each other rotate in an up-down direction is referred to as "forward rotation".

The magnetic core C is held between the blade lines 16 and is partially crushed. The resultant crushed pieces drop downward through a gap between the blade lines 16. A power source (motor) of each blade line 16 may be controlled such that when a load of at least a certain magnitude is applied to the motor of each blade line 16 that is being rotated, the blade line 16 is rotated reversely for a certain time period. After this, the blade line 16 is rotated forward again, so that the crushing is advanced. In this manner, the forward rotation and the reverse rotation are repeated alternately as necessary, and as a result, the magnetic core is entirely formed into crushed alloy ribbon pieces.

While being used for transformers, a majority of magnetic cores are immersed in an insulating oil. Such a magnetic core is usually formed of a stack of thousands of amorphous alloy ribbons. Therefore, the insulating oil remains between adjacent alloy ribbons by a capillary phenomenon.

There is a case where an epoxy resin is applied to an exposed part at an end of the alloy ribbons in the magnetic core in order to prevent the exposed part at the end of the alloy ribbons from coming off. Even if the epoxy resin is not used, there is a case where the magnetic core is covered with insulating paper or insulating cloth in order to prevent the end of the alloy ribbons from being freed into the insulating oil if coming off.

In the case where a biaxial shearing crusher as described above is used, the amorphous alloy ribbons are crushed into crushed amorphous alloy ribbon pieces at a high productivity even if the insulating oil remains or there is the epoxy resin, the insulating paper or the insulating cloth, without such an insulating substance preventing the crushing operation.

Even in the case where a copper or aluminum coil is wound around the magnetic core to be crushed, use of the biaxial shearing crusher allows the amorphous alloy ribbons to be appropriately crushed together with the coil.

<Magnetic Separation Step>

After the crushing step, the crushed alloy ribbon pieces, which are magnetic, are selectively adsorbed magnetically by a magnetic separation device. This separates the crushed alloy ribbon pieces, which are magnetic, and non-magnetic substances such as the resin, copper or the like from each other. The magnetic separation step may be performed as necessary before an insulating oil cleaning step described later.

In the case where the copper or aluminum coil winding the magnetic core is crushed together with the magnetic core in the crushing step, the resultant crushed pieces include crushed copper or aluminum pieces. Especially in such a case, it is effective to perform the magnetic separation step. This step allows the crushed copper or aluminum pieces, which are not magnetic, to be removed.

In the case where it is clear that the magnetic core put into the crusher contains only a small amount of epoxy resin and insulating oil in addition to the amorphous alloy ribbons, this step may be omitted.

<Cleaning Step>

In this step, an organic solvent and the crushed alloy ribbon pieces obtained in the crushing step are put into a cylindrical drum-shaped container, and the insulating oil mainly attached to the crushed alloy ribbon pieces is dissolved in the organic solvent.

Figure 3:
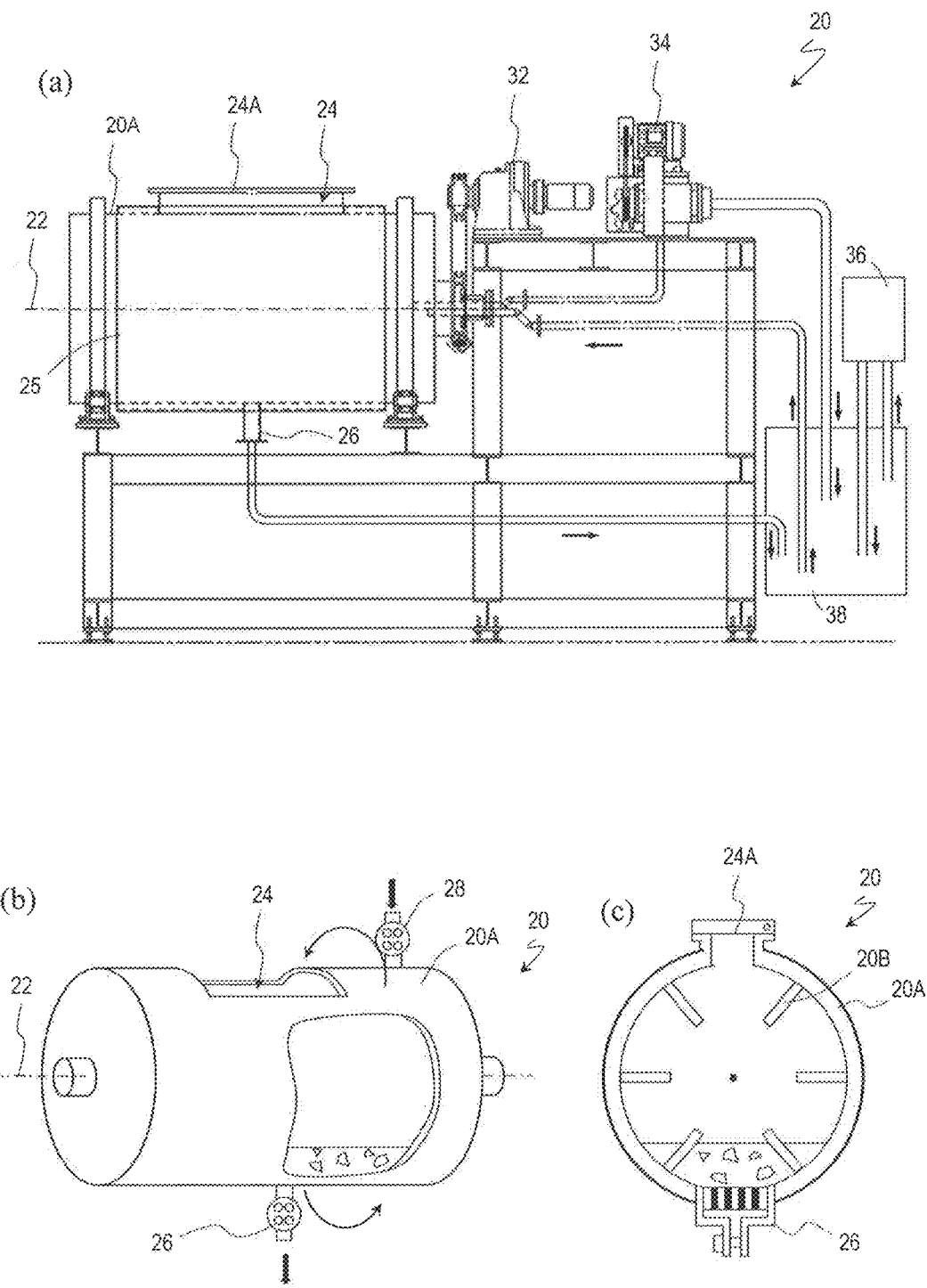
FIG. 3 shows an example of cleaning device usable in the process for manufacturing the reclaimed alloy material in the embodiment according to the present invention.

FIG. 3(*a*) through FIG. 3(*c*) are schematic views showing an example of drum-shaped cleaning device 20 usable in the cleaning step. As shown in FIG. 3(*a*) through FIG. 3(*c*), the drum-shaped cleaning device 20 includes a drum-shaped container 20A (hereinafter, occasionally referred to as the "drum 20A"), which is generally cylindrical and includes a rotation shaft 22 provided along the central axis of the cylinder. The rotation shaft 22 is rotatably supported. The drum 20A is located such that a longitudinal direction of the cylinder extends laterally and the rotation shaft 22 is generally horizontal to the ground.

The cleaning step is performed as follows by the drum-shaped cleaning device 20. First, the crushed alloy ribbon pieces are put to the inside of the cylindrical drum 20A. Then, the organic solvent in a heated state is put into the drum 20A before the drum 20A is sealed. After this, the drum 20A is rotated about the rotation shaft 22 for a predetermined time period. The rotation shaft 22 (and the central axis of the drum 20A) may be located horizontal to the ground as described above, or may be inclined with respect to the ground at an angle within 20 degrees. The drum 20A may be rotated by a rotation motor 32 connected to the rotation shaft 22 as shown in FIG. 3(*a*).

Such a rotation movement of the drum 20A causes the organic solvent to flow in the drum 20A. The crushed pieces are also moved in the drum 20A together with the organic solvent. In this manner, while the organic solvent is caused to flow, the crushed pieces are cleaned in the flow. Therefore, a high cleaning effect is provided. Instead of being rotated, the container (herein, the drum 20A) may be swung, inclined at different angles or in different directions in repetition, or moved back and forth like a piston along the rotation axis of the drum. In such a manner also, the organic solvent in the container may be caused to flow sufficiently. The container is not limited to being drum-shaped, and may be of any of various shapes in accordance with the form of the movement of the container.

The drum 20A may be designed to have a certain shape (capacity) in accordance with the amount to handle. For example, the drum 20A is set to have an inner diameter of 1500 to 2000 mm and an inner length in the direction of the rotation axis of 2500 to 3500 mm so as to handle 1000 to 2000 kg of crushed alloy ribbon pieces. The amount of the organic solvent to be put into the drum 20A may be 500 to 1000 kg for 1000 kg of crushed alloy ribbon pieces, so that the crushed alloy ribbon pieces are cleaned efficiently. The drum 20A may be formed of, for example, SS400, which is a general structural carbon steel, or stainless steel.

For dissolving the insulating oil attached to the crushed pieces in the organic solvent effectively, the drum 20A is rotated in one direction for 30 to 60 minutes at a rotation rate of 1 to 3 rotations per minute. It should be noted that the drum 20A may be rotated in opposite directions alternately for every predetermined time period. The rotation of the drum 20A causes the crushed alloy ribbon pieces and the organic solvent to move in the drum. During the rotation, the crushed pieces may be further crushed into smaller pieces. Especially in the case where the drum 20A includes a protrusion such as a fin or the like as described later, the crushing is promoted during the rotation of the drum.

In the case where the rotation rate of the drum 20A is less than one rotation per minute, the crushed alloy ribbon pieces and the organic solvent are not stirred sufficiently, and thus a sufficient cleaning effect may not be provided. By contrast, in the case where the rotation rate exceeds three rotations per minute, the crushed alloy ribbon pieces are not moved sufficiently in the drum 20A. In this case also, a sufficient cleaning effect may not be provided.

In the case where the cleaning is performed for less than 30 minutes, the remaining insulating oil may not be sufficiently dissolved in the organic solvent. By contrast, in the case where the cleaning is performed for more than 60 minutes, the crushed alloy ribbon pieces are excessively crushed during the rotation of the drum as described above, and thus the number of tiny crushed alloy ribbon pieces having a size smaller than 20 mm may be excessively increased. Especially in the case where the drum 20A includes a protrusion, such tiny crushed alloy ribbon pieces are easily formed. The tiny crushed alloy ribbon pieces are difficult to be removed from the drum 20A.

As shown in FIG. 3, the cleaning device 20 includes an inlet/outlet opening 24, through which the crushed alloy ribbon pieces are put into, and removed from, the drum 20A. The inlet/outlet opening 24 is provided in a part of an outer circumference of the drum 20A. The inlet/outlet opening 24 may have a size of, for example, 1000 to 1300 mm in the axial direction and 300 to 400 mm in the circumferential direction. The inlet/outlet opening 24 is preferably structured to seal the drum 20A with a lid 24A.

Preferably, a solvent discharge opening 26 formed of a perforated metal member and a metal mesh member, through which the used organic solvent is discharged, is provided at a position opposite to the inlet/outlet opening 24 with the rotation shaft 22 being located therebetween. The solvent discharge opening 26 is opened or closed by a valve. The perforated metal member includes openings preferably having a diameter of 5 mm or greater and 10 mm or less, such that the crushed alloy ribbon pieces do not pass the openings. The metal mesh member preferably has a size of 20 mesh or greater and 40 mesh or less, so as not to be easily clogged with the excessively small crushed alloy ribbon pieces.

Preferably, an injection opening 28, through which compressed air is introduced to the inside of the drum, is provided in order to allow the organic solvent to be discharged from the drum 20A easily.

The organic solvent to be put into the drum 20A may be of any type which dissolves the insulating oil to be removed. For example, a naphthene-based organic solvent, which costs low, is easily available and is low in toxicity, may be used.

In order to allow the insulating oil to be better dissolved, the organic solvent may be heated before being put into the drum 20A. The organic solvent is preferably heated to a temperature of 40 to 100° C. in the case where the organic solvent is heated to a temperature lower than 40° C., the insulating oil may not be dissolved sufficiently. In the case where the organic solvent is heated to a temperature higher than 100° C., the organic solvent has an excessively high vapor pressure, which is not preferable from the point of view of odor of the organic solvent during the operation. In addition, in the case where the organic solvent is heated to a temperature higher than 100° C., the cost for preventing fire is raised. The organic solvent is more preferably heated to a temperature of 50 to 70° C.

As shown in FIG. 3(a), the organic solvent is supplied to the inside of the drum 20A from, for example, a solvent tank 38 located outer to the drum 20A via a communication hole (pipe) provided along the rotation axis of the drum 20A. The organic solvent may be heated in the solvent tank 38 or in a pipe from the solvent tank 38 to the communication hole.

As shown in FIG. 3(b), the drum-shaped cleaning device 20 in this embodiment includes fins 20B protruding to an inner position of the drum 20A from an inner circumferential surface thereof. During the rotation of the drum, the fins 20B apply a bending stress to crushed alloy ribbon pieces that have not been sufficiently crushed and thus are relatively large. This allows the relatively large crushed alloy ribbon pieces to be crushed into smaller pieces, and thus the variance in the size of the crushed alloy ribbon pieces is decreased.

In this manner, the cleaning step performed while the drum 20A is rotated promotes the crushing of the crushed alloy ribbon pieces in addition to cleaning the crushed alloy ribbon pieces. As a result, the crushed alloy ribbon pieces put into the drum 20A are crushed to have a predetermined size or smaller. This allows the crushed alloy ribbon pieces to be removed from the drum more easily in a later step.

Each of the fins 20B is, for example, a rectangular metal plate protruding from the inner circumferential surface of the drum. The plurality of fins 20B may be provided at the same angle as seen from the central rotation shaft 22. Preferably, longer sides of each of the metal plates (fins 20B) have a length equal to the length of the drum in the direction of the rotation axis, and shorter sides of each of the metal plates have a length that is 20 to 50% of an inner radius of the drum. The metal plates each preferably have a thickness of 10 to 15 mm from the point of view of durability. The metal plates may be formed of, for example, SS400, which is a general structural carbon stainless steel or stainless steel.

In order to maintain the mechanical strength of the fins 20B, it is preferable that two shorter sides of each fin 20B that are connected with two end surfaces of the drum are respectively secured to the two end surfaces of the drum by welding or by use of bolts.

The number of the fins 20B may be any among four to eight in accordance with the degree of cleaning or crushing. It is preferable that six fins 20B are provided at an interval of 60 degrees in consideration of the efficiency of cleaning and crushing and maintenance. The fins 20B typically protrude in a radial direction of the drum (namely, toward the central axis of the drum). The fins 20B are not limited to protruding in this direction, and may protrude in a direction having an angle of 0 to 40 degrees with respect to the radial direction.

The fins 20B may extend from one of the end surfaces of the drum to a central position of the drum in the axial direction thereof.

In this case, six fins extending from the one end surface to the central position may be provided at an interval of 60 degrees, and another six fins extending from the other end surface of the drum to the central position may be provided at an interval of 60 degrees while being offset by 30 degrees from the six fins extending from the one end surface of the drum (namely, the six fins extending from the one end surface and another six fins extending from the other end surface may be located alternately).

The crushed alloy ribbon pieces after being cleaned preferably have a size of 50 mm or less in consideration of the ease of removal from the drum 20A. More preferably, the crushed alloy ribbon pieces have a size of 40 mm or less.

In order to make the size of the crushed alloy ribbon pieces 50 mm or less, the fins 20B may protrude by a length (namely, the shorter sides of the rectangular fins 20B may have a length) that is 30 to 35% of the inner radius of the drum. In order to make the size of the crushed alloy ribbon pieces 40 mm or less, the fins 20B may protrude by a length that is 28 to 32% of the inner radius of the drum.

The fins 20B are not limited to being rectangular as described above, and may have any of various shapes. The longer sides of the rectangular fins 20B may not be straight, and may be wavy or zigzag.

<Organic Solvent Discharge Step>

In this step, the organic solvent is discharged from the inside of the drum after the cleaning step.

In this step, the organic solvent having the oil dissolved therein in the insulating oil removal step described above is discharged from the drum 20A to decrease the content of the oil as an impurity.

The insulating oil removal step and the solvent discharge step may be performed in repetition, so that the content of the insulating oil remaining in the drum 20A may be further decreased. However, performing the insulating oil removal step and the solvent discharge step in repetition increases the number of steps. Therefore, for increasing the productivity, it is preferable to perform each of the insulating oil removal step and the solvent discharge step once.

The drum 20A is axially rotated to control the posture of the drum 20A such that the solvent discharge opening 26 is located at a lowermost position. Then, the valve is opened. In this manner, the solvent is discharged to the outside of the drum 20A. Immediately after this, compressed air may be introduced into the inside of the drum 20A via the injection opening 28, so that the solvent may be discharged from the inside of the drum more effectively. The compressed air to be introduced into the inside of the drum preferably has a pressure of 0.15 to 0.25 MPa (gauge pressure). Instead of the compressed air, compressed nitrogen gas may be used to increase the safety against fire.

After a majority of the organic solvent is discharged, the introduction of the compressed air may be stopped and the valve provided at the solvent discharge opening 26 may be closed. After being kept closed for 6 to 18 hours, the valve of the solvent discharge opening 26 may be opened again to discharge the solvent. In this case also, the compressed air may be introduced via the injection opening 28 to further promote the discharge and removal of the organic solvent.

As shown in FIG. 3(a), the organic solvent discharged via the solvent discharge opening 26 may be recovered to the organic tank 38 by, for example, the weight thereof. In order to allow the organic solvent recovered from the solvent discharge opening 26 to be reused, a distillation device 36 may be connected with the organic tank 38.

Figure 5:
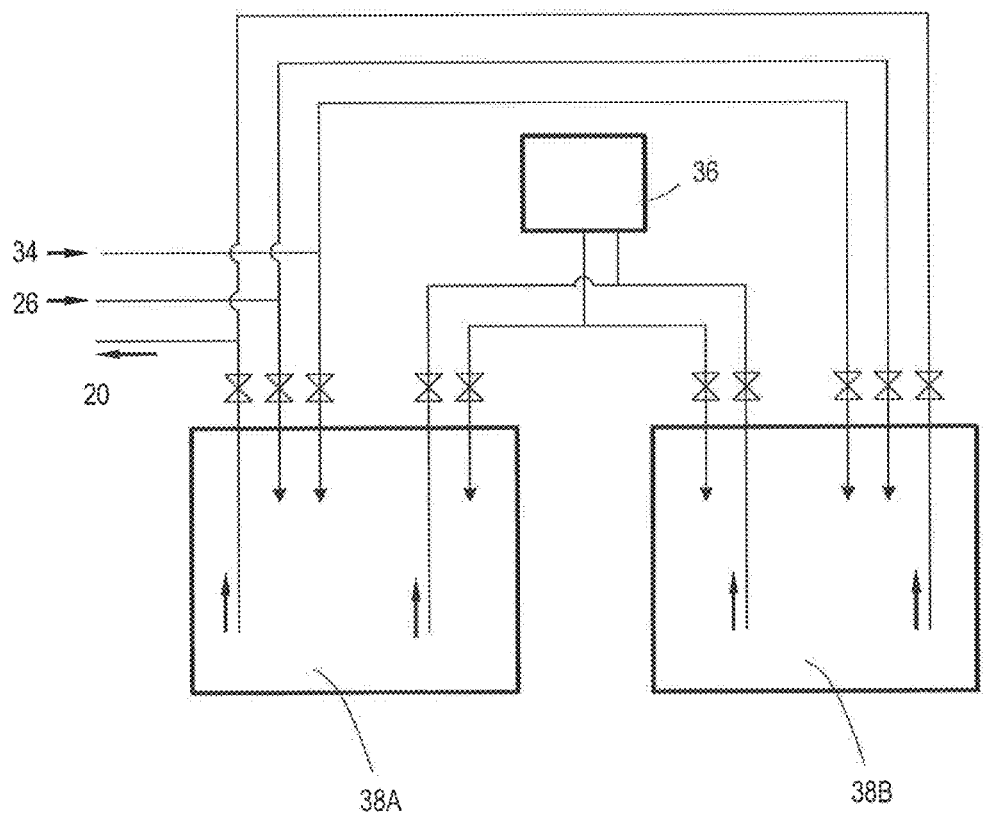
FIG. 5 shows how, in the cleaning device usable in the process for manufacturing the reclaimed alloy material in the embodiment according to the present invention, two solvent tanks connected to a distillation device are switched to be used.

As shown in FIG. 5, two solvent tanks 38A and 38B may be provided and the distillation device 36 may be commonly connected with the solvent tanks 38A and 38B, so that the two solvent tanks 38A and 38B are used alternately in the cleaning steps. This will be described more specifically. In the case where the used organic solvent is recovered to one of the tanks, for example, the tank 38A after one cleaning step, a clean organic solvent is supplied from the other tank 38B to the drum 20A for the next cleaning step. Then, while the cleaning step is performed with the organic solvent supplied from the tank 38B, the organic solvent recovered to the tank 38A is purified by the distillation device 36. When this cleaning step is finished, the used organic solvent is recovered to the tank 38B, and the purified organic solvent accumulated in the tank 38A is supplied to the drum 20A for the next cleaning step. During the cleaning step, the organic solvent recovered to the tank 38B is purified by the distillation device 36. In this manner, the two tanks 38A and 38B may be used such that the purified organic solvent is supplied to the drum 20A from the tank 38A or 38B for each cleaning step. Thus, the cleaning steps may be performed continuously with no need to wait for a long time for the organic solvent to be purified by the distillation device 36.

The used organic solvent may be recovered to the tank 38, 38A or 38B from a vacuum pump 34 described later in addition to from the solvent discharge opening 26.

<Remaining Organic Solvent Evaporation Step>

In this step, the pressure inside the drum is decreased and the drum is heated from an outer circumferential portion to evaporate and remove the organic solvent remaining in the drum.

After the organic solvent is discharged and the valve at the discharge opening is closed, the drum is heated from the outer circumferential portion thereof by a heating device provided on the outer circumferential portion thereof while the pressure inside the drum is decreased.

In order to decrease the pressure inside the drum, the vacuum pump 34 shown in FIG. 3(a) is connected with the drum 20A. During the decrease of the pressure, the organic solvent gasified in the drum is absorbed by the vacuum pump 34. The organic solvent absorbed by the vacuum pump 34 is returned to the solvent tank 38. The absorbed organic solvent may also be purified by the distillation device 36 to be reused.

The heating device usable to heat the drum 20A from the outside thereof may be, for example, a steam jacket 25 shown in FIG. 3(a). The steam jacket 25 is provided in contact with an outer circumferential surface of the drum 20A. The steam jacket 25 has high-temperature steam introduced thereto via a pipe (not shown), and thus heats the drum 20A from the outside thereof.

In this drying step, the drum is axially rotated to increase the evaporation and drying efficiency. During the rotation operation, the fins 20B inside the drum are put into contact with the crushed ribbon pieces and thus stir and disperse the crushed ribbon pieces. This makes it easy to perform the evaporation and drying. The rotation rate of the drum is preferably one to two rotations per minute. The drying may be performed for 3 to 10 hours to evaporate and remove most of the solvent.

As a heat source for heating, steam (water vapor) is used. This is safe because even if the remaining organic solvent (or gasified solvent) leaks to the outside of the drum 20A, there is no danger of explosion or fire. For increasing the evaporation capability, it is preferable to set the temperature of the steam to 140 to 160° C. The steam is cooled to become drops of water. The heating device may have a mechanism of discharging the drops of water from a drain when the amount of the accumulated drops of water exceeds a certain level.

The evaporated organic solvent is recovered by the vacuum pump 34 as described above and is trapped by a liquefaction device (not shown). The amount of the trapped organic solvent may be measured to estimate the amount of the organic solvent evaporated by being dried. The trapped organic solvent may be returned to the solvent tank 38 to be reused.

As described above, the remaining organic solvent may be evaporated and thus removed, so that the dried reclaimed alloy ribbon pieces are obtained and recovered from the drum.

It is conceivable to heat and evaporate the organic solvent at normal pressure. However, it is preferable in terms of safety to perform the heating and evaporation at reduced pressure because with the normal pressure, a measure for preventing the gasified organic solvent from causing a fire or explosion may be occasionally needed.

<Reclaimed Alloy Ribbon Piece Melting Step>

In this step, the reclaimed alloy ribbon pieces removed from the drum-shaped cleaning device 20 is put, as a part of a material to be melted, into a melting furnace located in the air or in a non-oxidative atmosphere.

In the case where the reclaimed alloy ribbon pieces are to be put into a molten alloy having the same composition as that of the reclaimed alloy ribbon pieces, the components of the molten alloy do not need to be adjusted in many cases. The reclaimed alloy ribbon pieces obtained by the above-described process are usable as they are as a material for obtaining a molten alloy.

The reclaimed alloy ribbon pieces obtained in the drying step are mostly deprived of the solvent as a result of the drying. However, the insulating oil dissolved in the solvent remaining in the organic discharge step may occasionally remain as an evaporation residue without being completely removed. A certain amount of the epoxy resin may also occasionally remain in the reclaimed alloy ribbon pieces.

If such remaining oil or resin is attached to the alloy ribbon pieces, the amount of carbon in the molten alloy is increased when the reclaimed alloy ribbon pieces are used as a part of the material to be melted. The studies made by the present inventors have found that in the case where the content of the reclaimed alloy ribbon pieces is 10% by mass or less with respect to the entirety of the molten alloy, it is not necessary to adjust the composition. More preferably, the content of the reclaimed alloy ribbon pieces is 6% by mass or less with respect to the entirety of the molten alloy. For providing a sufficient advantage of using the reclaimed alloy ribbon pieces in terms of the cost, the content of the reclaimed alloy ribbon pieces is preferably 3% by mass or greater with respect to the entirety of the molten alloy.

There is a case where the amount of carbon contained in the reclaimed alloy ribbon manufactured by use of the reclaimed alloy ribbon pieces (reclaimed alloy material) as the material may be relatively large. In such a case, the reclaimed alloy ribbon pieces may be used at a content exceeding 10% by mass with respect to the entirety of the molten alloy. For example, in the case where the cleaning step and the solvent discharge step described above are repeated and as a result, the oil attached to the crushed ribbon pieces is mostly removed, only the reclaimed alloy ribbon pieces may be used as the material to manufacture an amorphous alloy ribbon.

In the case where an excessive amount of carbon is contained in the molten alloy, it is often difficult to selectively decrease only the amount of carbon. A reason for this is the following. A composition system of an amorphous alloy is generally an Fe—Si—B system. Therefore, even if it is attempted to remove carbon in the molten alloy by oxidation performed by introduction of air (air bubbling, etc.), Si or B tends to be first oxidized. For this reason, it is often difficult to decrease the amount of carbon.

<Alloy Ribbon Manufacturing Step>

In this step, the molten alloy obtained by the melting step is supplied to a cooling roll and rapidly solidified into the form of a ribbon to obtain an amorphous alloy ribbon.

Figure 4:
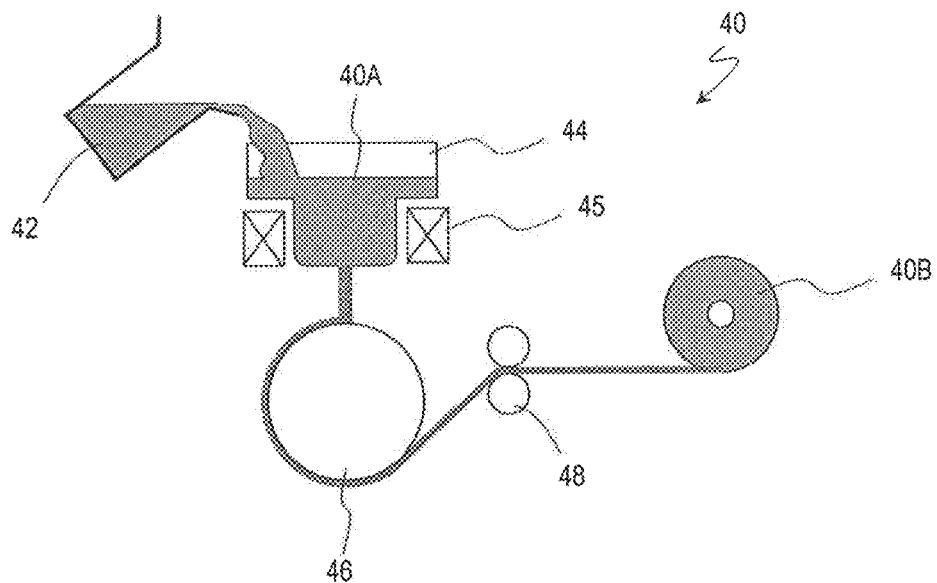
FIG. 4 shows a manufacturing device usable in the process for manufacturing the reclaimed amorphous alloy ribbon in the embodiment according to the present invention.

FIG. 4 shows an alloy manufacturing device 40 usable to manufacture an amorphous alloy ribbon in this embodiment. The alloy manufacturing device 40 is structured to put molten alloy 40A, which is a material alloy (containing the above-described reclaimed alloy ribbon pieces) melted in the melting furnace 42, into contact with a cooling roll 46 via a nozzle provided below a molten alloy reservoir 44 while the cooling roll 46 is rotating. A heating device (induction coil) 45 may be provided to maintain the temperature of the molten alloy in the molten alloy reservoir 44.

For manufacturing the amorphous alloy ribbon, a single roll method is used by which the molten alloy is supplied to a circumferential surface of the rotatable cooling roll 46 by the above-described alloy ribbon manufacturing device 40. Thus, the ribbon is obtained. The cooling roll 46 is preferably formed of a copper alloy mainly containing copper having a high thermal conductivity. In the alloy manufacturing device 40, the molten alloy rapidly solidified on the surface of the cooling roll 46 may be rolled via a guide 48 and obtained as an amorphous alloy ribbon 40B. As a result of these steps, the amorphous alloy ribbon formed of the reclaimed alloy ribbon pieces is manufactured.

Examples

A transformer was disassembled, and 40 magnetic cores each having a mass of 50 kg and formed of a magnetic alloy in a stacked state, namely, the magnetic cores having a total mass of 2000 kg were sequentially put into a biaxial shearing crusher. The magnetic cores were crushed at a rate of 3 minutes for one magnetic core. Two shaft members of the crusher each had ten shearing blades located in a stacked manner. The shearing blades each had a diameter of 700 mm and a thickness of 50 mm.

As a result of performing the crushing, crushed alloy ribbon pieces having the same mass were obtained. The obtained crushed alloy ribbon pieces included various types of crushed pieces from an amorphous crushed piece having a maximum length of about 50 mm to an amorphous crushed piece having a maximum length of about 150 mm or greater.

Next, crushed epoxy resin powder or the like was removed from the crushed alloy ribbon pieces by a magnetic separation device.

Then, the crushed alloy ribbon pieces having a mass of 2000 kg were put into a horizontally rotatable drum (formed of SS400), having an inner diameter of 1700 mm and a length in the direction of the rotation axis of 2500 mm, via an inlet/outlet opening (1300 mm (length in the direction of the rotation axis)×350 mm (length in the circumferential direction)). 2000 kg of "Naphtesol Grade 160" produced by JX Nippon Oil & Energy Corporation heated to 60° C. was put into the drum. Then, the drum was sealed with an airtight lid.

On an inner circumferential surface of the drum, six fins were provided at an interval of 60 degrees as seen from the central rotation axis. Each fin was located to protrude toward the rotation axis, and was formed of an SS400 plate having a length of 300 mm in the protruding direction and a thickness of 13 mm.

The drum was operated for 50 minutes at a rotation rate of 1.5 rotations per minute to remove the insulating oil mainly attached to the crushed pieces.

Then, after the drum was rotated to locate an organic solvent discharge opening at a lowest position, a valve at the organic solvent discharge opening was opened. Immediately after this, compressed air was introduced into the inside of the drum via a compressed air injection opening at a pressure of 0.2 MPa to discharge the organic solvent. At the organic solvent discharge opening, a perforated metal member including openings having a diameter of 8 mm and a metal mesh member having a size of 30 mesh were provided. It was confirmed that only the organic solvent was discharged and that the crushed alloy ribbon pieces were not discharged almost at all.

Next, the valve at the solvent discharge opening was closed, and the pressure inside the drum was decreased while the drum was heated by a steam heating device provided to enclose an outer circumferential surface of the drum.

The temperature of the steam was about 150° C. The drops of water generated by cooling the steam were discharged from the drain at appropriate timings.

The drying was performed for six hours while the drum was rotated at a rotation rate of 1.5 rotations per minute. As a result, the solvent was mostly evaporated and thus removed. The evaporated organic solvent was trapped by a cooling device. The amount of the trapped organic solvent was measured to estimate the amount of the organic solvent evaporated by drying.

Then, the heating with the steam was stopped, and air was introduced such that the pressure inside the drum would be an atmospheric pressure. Next, the drum was rotated to locate the inlet/outlet opening of the drum at an uppermost position. After the lid was opened, the drum was rotated to locate the inlet/outlet opening at the lowermost position, and the crushed alloy ribbon pieces were removed onto a metal bucket. Maximum sizes of the obtained reclaimed alloy ribbon pieces were evaluated to find that the pieces having a maximum size of 20 mm to 50 mm occupied about 95% by mass of all the pieces.

Next, an amorphous alloy ribbon was manufactured by use of the reclaimed alloy ribbon pieces obtained as described above. For this purpose, first, molten alloy materials having a total capacity (mass) of 1000 kg were put into an induction furnace located in the air. As the molten alloy materials, four materials 1) through 4) below were put such that the total mass thereof would be 1000 kg and the composition would contain, by atomic %, 8.9% of Si, 11.2% of B, and the remaining part of Fe and unavoidable impurities. The composition of the reclaimed alloy ribbon pieces was the same as the above-described composition.

1) Reclaimed alloy ribbon pieces: 50 kq
2) Ferro-boron
3) Ferro-silicon
4) Pure iron In this example, the ratio by mass of the reclaimed alloy ribbon pieces with respect to the entirety of the materials was 5% (=50/1000).

After being melted, the molten alloy was injected toward the rotating cooling roll formed of a copper alloy via a ceramic nozzle to manufacture an amorphous alloy ribbon having a width of 140 mm and a thickness of 25 μm.

The content of carbon in the manufactured alloy ribbon was measured by a combustion-infrared absorption method. The result was 0.3% by atom. This value was equivalent to the value in the amorphous alloy ribbon manufactured by use of 2) through 4) as the materials with no use of the reclaimed alloy ribbon pieces listed as 1).

The alloy ribbon manufactured by use of 1) through 4) as the materials, and the alloy ribbon manufactured by use of 2) through 4) as the materials, were compared against each other in terms of the ribbon properties and the magnetic characteristics. No significant difference was recognized. The alloy ribbons manufactured by use of 1) through 4) were confirmed to have splendid property stability.

INDUSTRIAL APPLICABILITY

In an embodiment according to the present invention, a material of a reclaimed alloy may be obtained from a magnetic core used in a transformer or the like. In addition, this material may be used to manufacture a reclaimed amorphous alloy ribbon.

REFERENCE SIGNS LIST

10 Crusher
20 Drum-shaped cleaning device
40 Alloy manufacturing device

The invention claimed is:

1. A process for manufacturing a reclaimed alloy material, comprising the steps of:
   crushing a magnetic core including an amorphous alloy ribbon into crushed pieces;
   putting a prepared organic solvent and the crushed pieces into a container, wherein the container includes a cylindrical shape and is rotatably supported around a central axis of the cylindrical shape as a rotation shaft;
   putting the crushed pieces into contact with the organic solvent in the container;
   sealing the container with an airtight lid;
   cleaning the crushed pieces, and rotating the container at a rotation rate of 1 to 3 rotations per minute;
   selectively discharging the organic solvent from the container after putting the crushed pieces into contact with the organic solvent and cleaning the crushed pieces; and
   evaporating, after discharging the organic solvent, the organic solvent remaining in the container;
   removing the crushed pieces after the organic solvent is evaporated, and reusing the crushed pieces as a reclaimed alloy material,
   wherein the container includes a plurality of fins positioned to protrude to an inner position of the container from an inner circumferential surface thereof,
   wherein each fin of the plurality of fins protrudes a length of 20 to 50% of an inner radius of the container.

2. The process according to claim 1, wherein evaporating the organic solvent remaining in the container comprises decreasing a pressure inside the container and heating an outer circumferential portion of the container to evaporate the organic solvent remaining in the container after the organic solvent is discharged.

3. The process according to claim 1, wherein putting the crushed pieces into contact with the organic solvent comprises putting the crushed pieces into contact with the organic solvent in a flow of the organic solvent generated by moving the container.

4. The process according to claim 1, further comprising magnetically adsorbing and thus separating the crushed pieces by a magnetic separation device.

5. The process according to claim 1, wherein the magnetic core crushed by a biaxial shearing crusher.

6. The process according to claim 1, wherein the organic solvent is put into the container at a temperature between 40° C. and 100° C.

7. The process according to claim 1, wherein the outer circumferential portion is heated using steam.

\* \* \* \* \*